(No Model.) 3 Sheets—Sheet 1.

E. A. NEWMAN.
APPARATUS FOR REGULATING THE TEMPERATURE AND FLOW OF WATER IN PIPES.

No. 372,232. Patented Oct. 25, 1887.

Witnesses
Lloyd B. Wight
E. O. Davidson

Inventor
Edwin A. Newman.
By his Attorneys
Baldwin, Hopkins & Peyton, (No Model.) 3 Sheets—Sheet 2.
E. A. NEWMAN.
APPARATUS FOR REGULATING THE TEMPERATURE AND FLOW OF WATER IN PIPES.
No. 372,232. Patented Oct. 25, 1887.
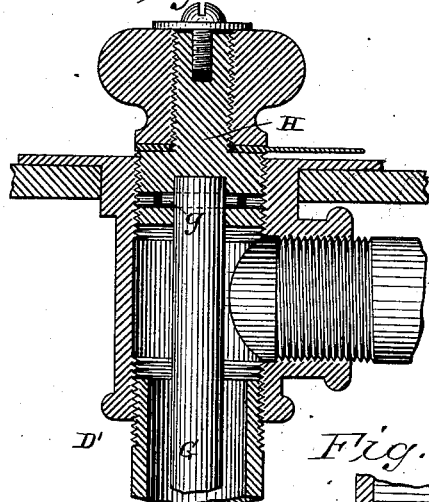
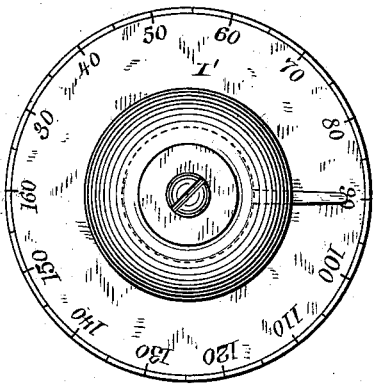
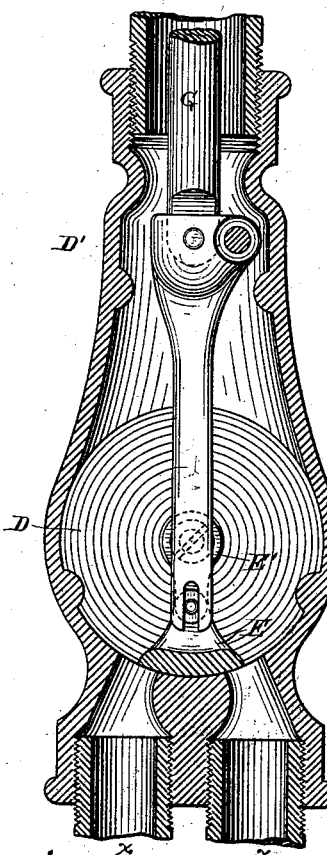
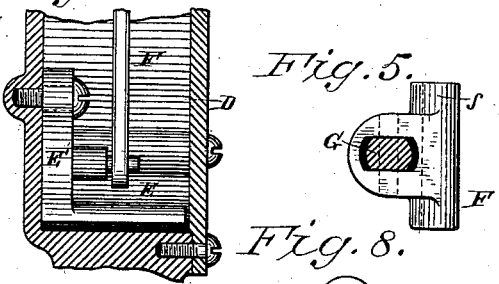
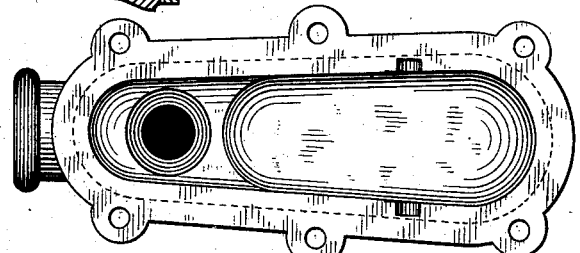
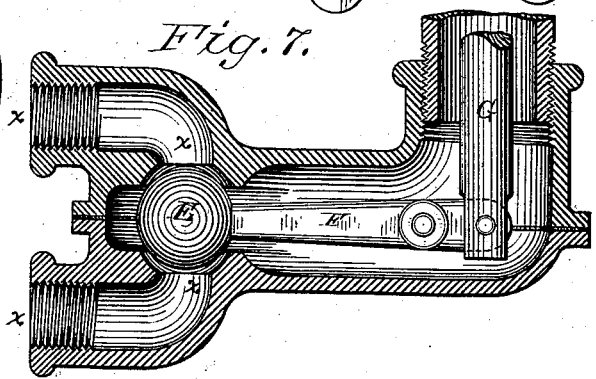
Witnesses
Lloyd B. Wight
C. A. Davidson.
Inventor
Edwin A. Newman
By his Attorneys
Baldwin, Hopkins & Peyton.

(No Model.) 3 Sheets—Sheet 3.

E. A. NEWMAN.
APPARATUS FOR REGULATING THE TEMPERATURE AND FLOW OF WATER IN PIPES.

No. 372,232. Patented Oct. 25, 1887.

Witnesses
Lloyd B. Wight.
E. C. Davidson.

Inventor
Edwin A. Newman,
By his Attorneys
Baldwin, Hopkins & Payton.

N. PETERS, Photo-Lithographer, Washington, D. C.

UNITED STATES PATENT OFFICE.

EDWIN A. NEWMAN, OF WASHINGTON, DISTRICT OF COLUMBIA, ASSIGNOR OF ONE-FOURTH TO DAVID L. SNEDIKER, OF EMPORIA, KANSAS.

APPARATUS FOR REGULATING THE TEMPERATURE AND FLOW OF WATER IN PIPES.

SPECIFICATION forming part of Letters Patent No. 372,232, dated October 25, 1887.

Application filed November 13, 1886. Serial No. 218,817. (No model.)

*To all whom it may concern:*

Be it known that I, EDWIN A. NEWMAN, of Washington city, District of Columbia, have invented certain new and useful Improvements for Regulating the Temperature and Flow of Water in Water-Service Pipes, of which the following is a specification.

A primary feature of my invention is the provision of means for establishing a communication between hot and cold water pipes of a pipe system to prevent freezing.

The invention further consists in the use of a thermostatic apparatus which, upon a given temperature, operates to put the hot and cold water pipes of the system into connection, thereby establishing a circulation which tends to equalize the temperature of the water in the hot and cold water pipes, and thus prevents freezing.

Another use of or advantage incident to my invention is that the thermostatic arrangement may be used for the purpose of drawing water of any desired temperature from a single faucet, to which both the hot and cold water are conveyed, as appears more fully below.

Figure 1:
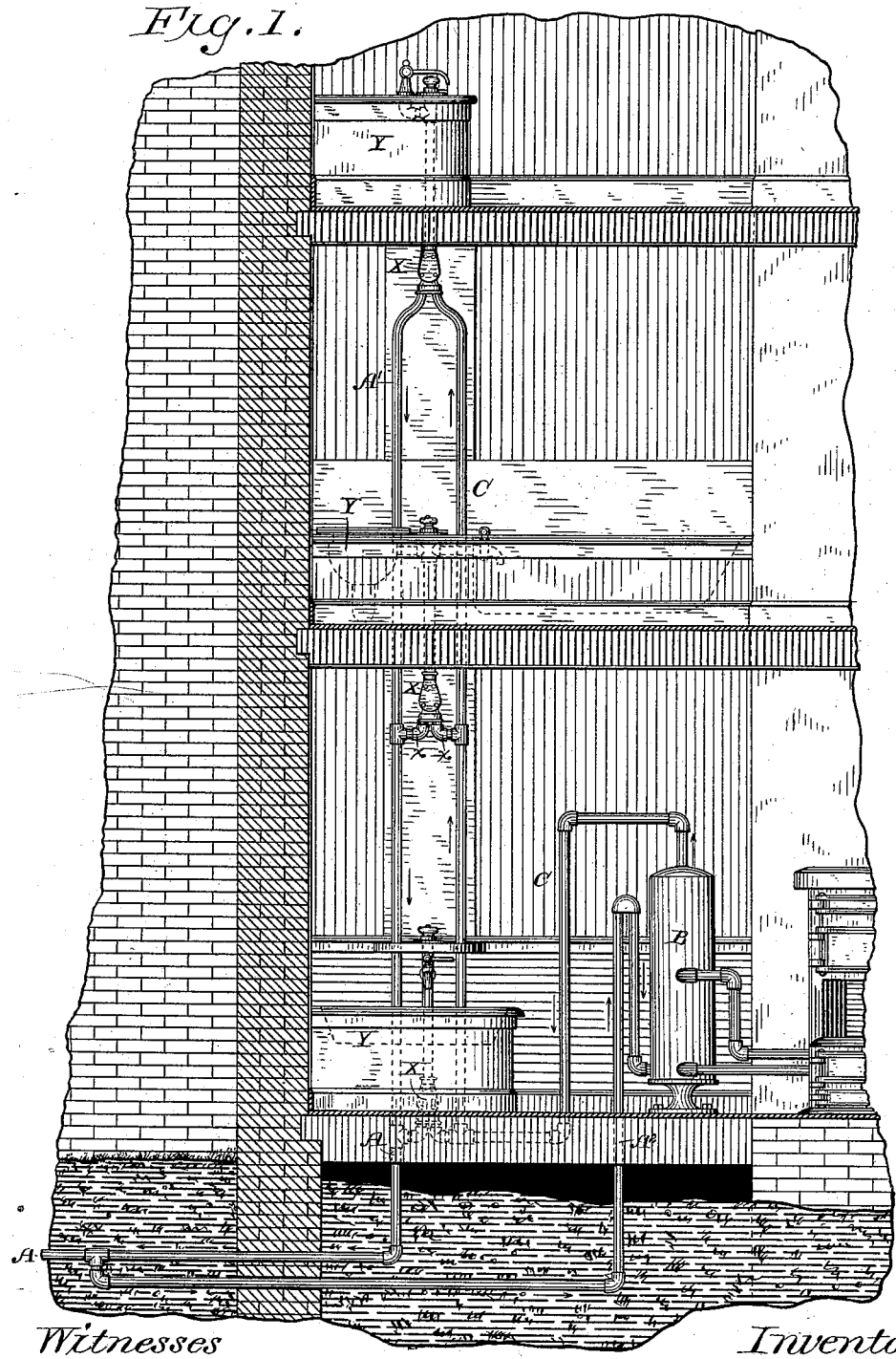
Figure 9:
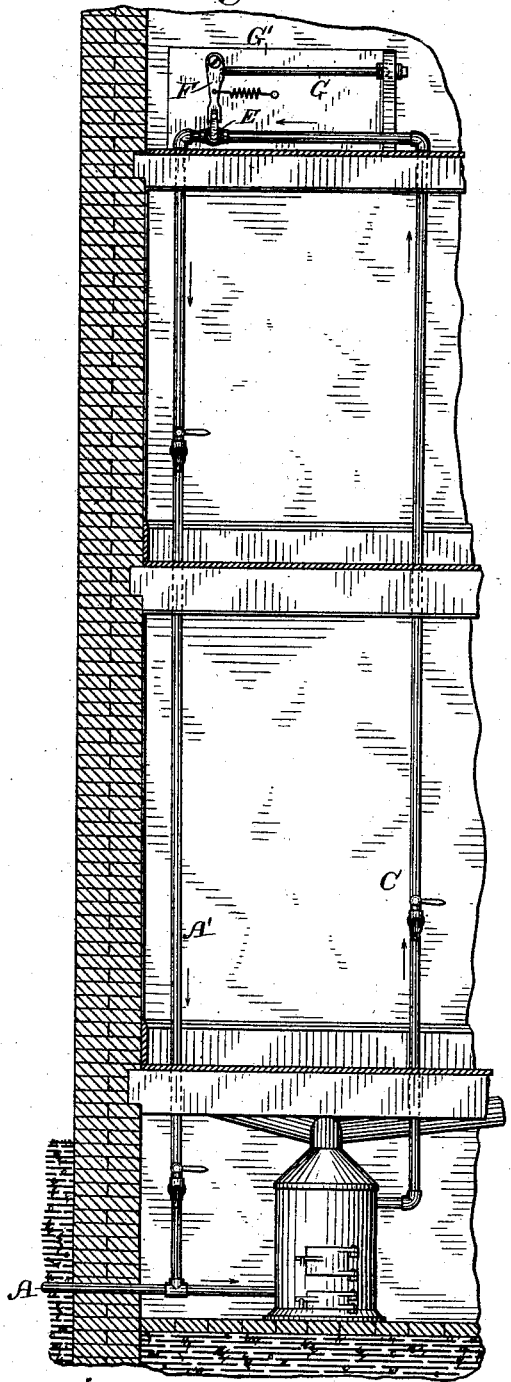
Figure 10:
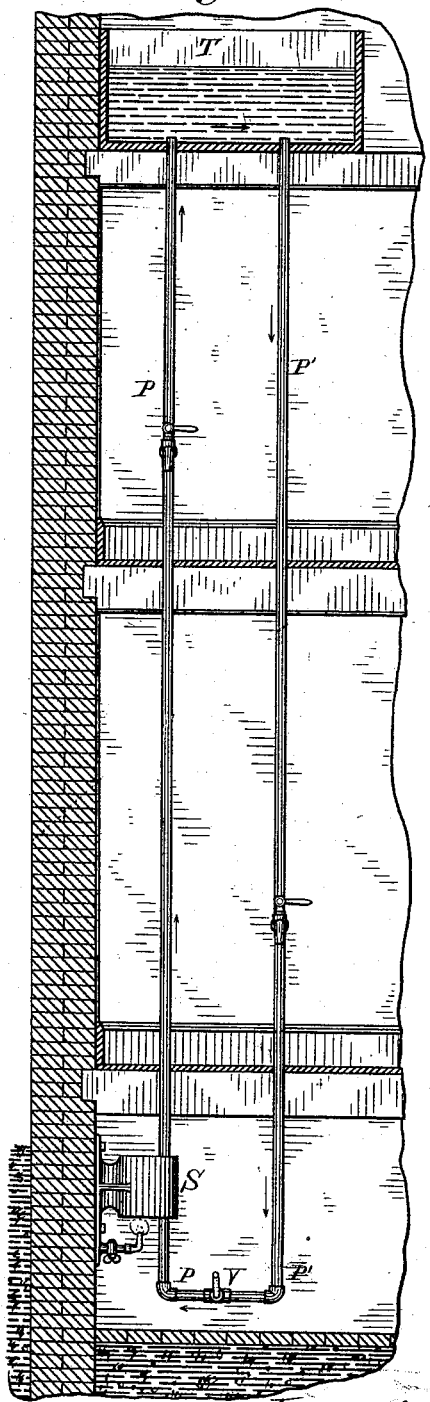

In the accompanying drawings, Figure 1 is a sectional view of the interior of a house, showing a general arrangement of water-pipes which may be adopted. Figs. 2 to 8, inclusive, are detail views illustrating the structure of the thermostatic apparatus and the valve operated thereby. Fig. 9 is a sectional view of a portion of the interior, showing another arrangement of service-pipes; and Fig. 10 is a similar view of still another arrangement.

In the several drawings the structure of the thermostatic apparatus and suitable general arrangement of pipes are shown; but the invention is not limited to any such details.

Referring specially to Fig. 1, A represents the pipe from the water-main, one branch, A', of which conveys the cold water through the dwelling, while the other, A², runs to and is connected in the usual manner to a domestic boiler, B, properly connected, as usual, with the water-back of a heating apparatus. The pipe C is the hot-water pipe, leading from the boiler B and distributing the hot water through the dwelling. At any suitable point, in one or more places, as may be desired—say at X X in this figure—the hot and cold water pipes are each connected with a valve-chamber, the valve in which is controlled by a thermostat, as is presently fully described, so as to permit a flow of water from one of the pipes to the other through the connecting-pipes $x\,x$ and valve-chamber. This will of course tend to equalize the temperature of the water in the pipes and will prevent freezing. Y Y Y in this figure represent either sinks, stands, or tubs for ordinary domestic purposes.

A valve and thermostatic apparatus suitable to be applied at a point, X, in the pipe system shown in Fig. 1 is illustrated in Figs. 2, 4, 5, and 6, to which reference is now specially made. Let $x\,x$ represent the pipes which lead, respectively, from the hot and cold water pipes to the valve-chamber D, in which an oscillating valve, E, is pivoted at one side of the casing by a right-angular upright portion, E', of the valve. This valve may be rocked upon its pivot to close or partly close or open either of the pipes $x\,x$. The valve is operated and controlled in the following manner: A horizontally-projecting point on the upright side piece, E', of the valve is straddled by the forked end of a lever, F, which is pivoted at $f$ in the upper part of the valve-chamber D at a point more or less to one side of a vertical line drawn through the pivot of the valve E. The upper end of the lever F is enlarged, as shown, and has pivoted therein the lower end of the thermostat-bar G, which is inclosed within an extension, D', of the valve-chamber, its upper end being suitably secured by a pin, $g$, in a screw-plug, H, which works in the upper part of the extension D'.

I is a water-delivery pipe connected with a suitable faucet. By screwing the plug H up and down the thermostatic rod may be adjusted endwise relatively to the valve E. In this adjustment the lever F will turn upon its pivot $f$, while the necessary play at the valve E is allowed by reason of the lever F being formed with a forked end, which loosely straddles the horizontal pin on the valve, as before mentioned.

Assuming that the right-hand pipe $x$ is the hot-water pipe, and that it is closed by the valve E, and that the thermostatic rod G has been adjusted properly, should the cold water in the pipe $x$ and valve-chamber D D' fall below a given temperature, the contraction of the thermostatic rod would partly open the hot-water pipe $x$, so as to open a communication between the hot and cold water pipes, as before remarked, and thus tend to equalize the temperature of the water in the pipes and prevent freezing.

The parts will be automatically restored to the initial position above recited when the increased temperature in the casing has operated to again expand the thermostatic rod. By this automatic intermittent operation the water in the cold-water pipes may be maintained at the desired temperature.

In Fig. 1 I have shown an apparatus of this kind at the points X, where tubs or sinks are located; but of course the connections at such places may be the ordinary ones, and my invention might be applied at some other independent point in the pipe system.

Any other suitable form of thermostatic apparatus and valve might be employed. For instance, in Figs. 7 and 8 I have shown a somewhat different construction, in which the thermostatic bar G is connected at its end with the short arm of a lever, F, the opposite end of which carries a ball-valve, E, which operates to regulate the flow of water through the opposite pipes $x$ $x$.

A multiplication of illustration and description of such obvious variations in construction is not deemed necessary.

In Fig. 9 I have shown an arrangement of hot and cold water pipes in which the thermostatic rod G is located at the top of the pipe system, mounted upon any suitable frame or support, G', and adapted to operate the valve E through the intervention of a pivoted lever, F, as will be plain from the drawings.

In Fig. 10 I have shown an arrangement in which a water-tank, T, is located in the upper part of a building and distributes water through two pipes, P P'. At any suitable point is located a small boiler or tank, S, with which one of said pipes is connected. This tank may be heated in any suitable way—as, for instance, by a gas-jet, as illustrated. At some point, preferably at the bottom of the house, a valve, V, connects the two pipes P P'. In cold weather, by turning this valve by hand or otherwise, communication between the two pipes P P' at that point may be established and a circulation set up within the pipes to prevent freezing. Of course, when only heat enough is desired at the point S to prevent freezing, a very small degree of heat is required—only enough to cause a slight movement of the water in the pipes. Of course, where warm water is needed for domestic purposes, some more elaborate heating apparatus may be employed. Obviously, instead of the thermostatic apparatus illustrated in the other figures, I might employ a valve operated by hand, so that in cold weather a person might move it sufficiently to establish communication between the hot and cold water pipes. When the circulation is established in this way, however, it would continue, there being a constant tendency to equalization of temperature in the two pipes. Where the thermostatic apparatus is used, as described, should the water become very cold in the cold-water pipes, sufficient hot water would be admitted to raise the temperature, when the thermostat would, by expansion, operate in the opposite direction to close the hot-water opening and restore the apparatus to the normal condition.

In order to accurately adjust the thermostat with facility, I provide a pointer on the adjusting-plug H, which traverses over a concentrically-arranged dial, I', which is marked with figures indicating the temperature to which the thermostat may be adjusted. For instance, in order to guard against the freezing of the water in the pipes, the pointer may be brought to 40 on the dial, thus adjusting the thermostat to operate to admit hot water when the temperature in the casing falls below 40.

Another advantage incident to the use of my invention is that by means of the thermostatic apparatus a person may draw water of any desired temperature from the pipe H, Fig. 2.

When the parts are properly related, by the rotation of the plug H the thermostat may be so adjusted as to produce a combined flow of water from the hot and cold water pipes $x$ $x$, so as to discharge water of the proper temperature from the pipe H.

So far as I am aware, I am the first to make a connection between the hot and cold water pipes of a pipe system to prevent freezing. I am also, so far as I am aware, the first to employ a thermostatic apparatus for putting the hot and cold water pipes of a pipe system into connection.

I am aware of the use of compound faucets by which mingled hot and cold water may be drawn from a pipe system, and do not claim such matter.

I claim as my invention—

1. The combination, with the hot-water pipes of a building and a separate system of cold-water pipes, of an interposed valve communicating only with said hot and cold water pipes, whereby communication may be opened or closed between said pipes and a circulation of hot water in the cold-water pipes effected, for the purpose described, without drawing or discharging water from the pipe system, and independent cocks or faucets for drawing the water from said pipes.

2. The combination, substantially as set forth, of the hot and cold water pipes of a pipe system, a valve by which they may be placed in communication, and a thermostat for controlling the valve.

3. The combination of the hot and cold water pipes of a pipe system, a valve by which they may be placed in communication, and a thermostat immersed in the water for operating the valve.

4. The combination of the hot and cold water pipes x x, a valve for controlling the flow of water from said pipes, a thermostat immersed in the water for controlling said valve, and a common discharge-pipe, I.

5. The combination of the hot and cold water pipes x x, leading to a common chamber or casing, a valve within said chamber or casing for controlling the flow of water from said pipes, a thermostat also arranged in said chamber or casing for operating the valve, and a discharge-pipe, I.

6. The combination of the hot and cold water pipes x x, leading to a common chamber or casing, a valve within said chamber or casing for controlling the flow of water from said pipes, a thermostat also arranged in said chamber or casing for operating the valve, a discharge-pipe, I, and means for adjusting the thermostat, for the purpose set forth.

7. The combination of the hot and cold water pipes x x, leading to a common chamber or casing, a valve within said chamber or casing for controlling the flow of water from said pipes, a thermostat, also arranged in said chamber or casing, for operating the valve, a discharge-pipe, I, means for adjusting the thermostat, and a dial and pointer to indicate the temperature at which the thermostat is adjusted.

In testimony whereof I have hereunto subscribed my name.

EDWIN A. NEWMAN.

Witnesses:
H. J. ENNIS,
BALTUS DELONG.